(12) United States Patent
Eberle et al.

(10) Patent No.: US 6,361,896 B1
(45) Date of Patent: Mar. 26, 2002

(54) DEVICE AND METHOD FOR COMBINED PURIFICATION AND COMPRESSION OF HYDROGEN CONTAINING CO AND THE USE THEREOF IN FUEL CELL ASSEMBLIES

(75) Inventors: Klaus Eberle, Biberach; Bernd Rohland, Ulm; Joachim Scholta, Ulm; Raimund Stroebel, Ulm, all of (DE)

(73) Assignee: Zentrum fur Sonnenenergie und Wasserstoff-Forschung Baden Wuetternberg Gemeinnuetzige Stiftung, Stuttgart (DE)

( * ) Notice: Subject to any disclaimer, the term of this patent is extended or adjusted under 35 U.S.C. 154(b) by 0 days.

(21) Appl. No.: 09/171,368
(22) PCT Filed: Apr. 18, 1997
(86) PCT No.: PCT/EP97/01959
§ 371 Date: Mar. 4, 1999
§ 102(e) Date: Mar. 4, 1999
(87) PCT Pub. No.: WO97/40542
PCT Pub. Date: Oct. 30, 1997

(30) Foreign Application Priority Data

Apr. 19, 1996 (DE) .......................... 196 15 562

(51) Int. Cl.$^7$ .......................... H01M 4/86; C01B 31/20; B01J 23/00; C23F 13/00
(52) U.S. Cl. .......................... 429/40; 429/44; 423/437.2; 502/182; 204/196.38
(58) Field of Search .......................... 429/40, 41, 44, 429/34, 30; 204/282, 283, 280, 196.38; 502/152, 182, 101, 102, 103; 423/247, 651, 437.2

(56) References Cited

U.S. PATENT DOCUMENTS

| | | | |
|---|---|---|---|
| 4,911,803 A | * | 3/1990 | Kunz .......................... 204/130 |
| 5,419,980 A | * | 5/1995 | Okamoto et al. .............. 429/32 |
| 5,512,263 A | * | 4/1996 | McIntyre ...................... 204/282 |
| 5,534,362 A | * | 7/1996 | Okamoto et al. .............. 429/32 |
| 5,795,669 A | * | 8/1998 | Wilkinson et al. ............. 429/40 |

* cited by examiner

Primary Examiner—Stephen Kalafut
Assistant Examiner—Raymond Alejandro
(74) Attorney, Agent, or Firm—Nath & Associates PLLC; Gary M. Nath; Jerald L. Meyer

(57) ABSTRACT

The invention relates to a device for combined purification and compression of hydrogen containing CO. Said device comprises a polymer electrolyte membrane (PEM) cell with a proton-conducting polymer membrane (3), an anode on one side of the membrane and a cathode (4) on the other side thereof. Said anode is in the form of a two-layer anode (5) which comprises a CO-oxidation-selective catalytic layer (1) on the side facing away from the membrane and an electrochemically active layer (2) for oxidation of the hydrogen to form protons on the side facing the membrane. The PEM cell also has a flat, porous gas distribution layer provided on the anode side and attached to a current collector. Consequently, the PEM cell resists differential pressures of at least approximately 10 bar. The invention also relates to a process for combined purification and compression of hydrogen containing CO using said device. The CO in the hydrogen containing CO is oxidized selectively to form $CO_2$ in the PEM cell, and the hydrogen subsequently extensively free of CO is compressed by the PEM cell by electrochemical means at differential pressures of at least approximately 10 bar. The resultant hydrogen is suitable as fuel in PEM fuel cells for vehicles.

10 Claims, 1 Drawing Sheet

Figure 1:
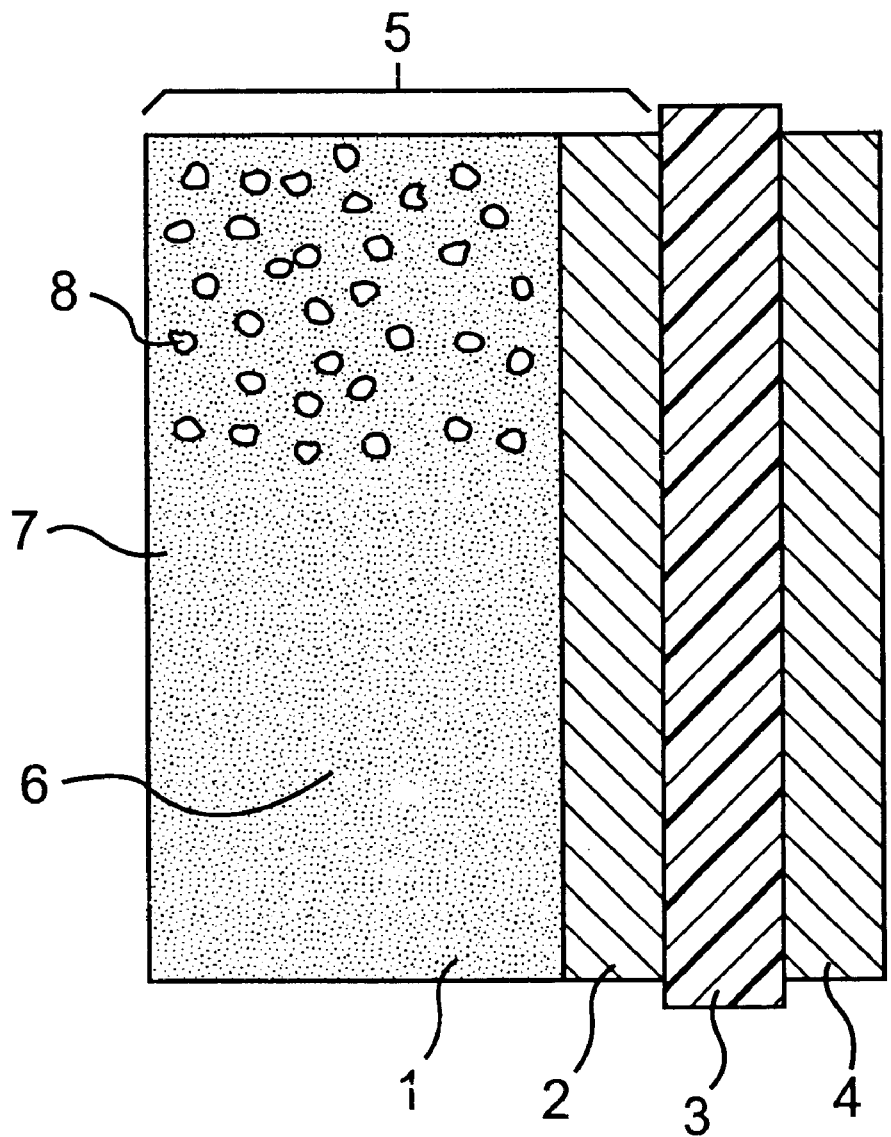

DEVICE AND METHOD FOR COMBINED PURIFICATION AND COMPRESSION OF HYDROGEN CONTAINING CO AND THE USE THEREOF IN FUEL CELL ASSEMBLIES

DESCRIPTION

The invention relates to an apparatus and a process for the combined purification and compression of CO-containing hydrogen and to the use of the hydrogen thus obtained as a fuel gas in polymer electrolyte membrane (PEM) fuel cells.

Fuel cells are distinguished by high electric efficiency, low pollutant emissions and low noise levels and are therefore highly suitable to drive vehicles. Finding favour for this application is the polymer electrolyte membrane (PEM) fuel cell, given its operating temperature range, its robustness and its tolerance with respect to pressure fluctuations. PEM fuel cells do, however, have to be operated with pure hydrogen ($H_2$) as a fuel. On the other hand, it is advantageous that, as an alternative to oxygen ($O_2$), air can be used as the oxidant. CO fractions above 20 ppm in the hydrogen used as a fuel gas cause poisoning of the electrode and a marked drop in performance in conjunction with excessive specific energy consumption.

The purification of hydrogen conventionally takes place discontinuously by means of pressure swing adsorption (PSA). The processes based on this technique do however involve high specific energy consumption, require a bulky construction and are therefore unsuitable for operating vehicles.

Known mechanical processes for compressing hydrogen comprise, for example, the use of piston compressors, screw compressors and rotary compressors. Such methods do, however, involve high noise levels and, particularly in the case of installations carrying an electric load of up to 10 kW, require a high specific energy input.

GB-A-2 268 322 discloses that pure hydrogen can be compressed electrochemically, using PEM cells, to up to a differential pressure of 5 bar. Above such a differential pressure the electrode mountings of the known PEM cells are subject to cracking.

Hydrogen produced as a reformer gas from methanol or other hydrocarbons contains varying amounts of carbon monoxide (CO). The provision of ultrapure, CO-free hydrogen from such reformer gases, in particular for the cold-start phase of fuel cell vehicles, while at the same time ensuring a load change behaviour on a timescale ranging from milliseconds to seconds, is technically not feasible as yet.

The object of the present invention is therefore to provide a low-noise and energy-efficient apparatus and a process for the combined purification and compression of CO-containing hydrogen, differential pressures of at least about 10 bar being achievable.

This object is achieved according to the invention by an apparatus according to Claim 1 and a process according to Claim 9. Advantageous or particularly expedient refinements of the subject-matter of the invention are specified in the subordinate claims.

The invention therefore relates to an apparatus for the combined purification and compression of CO-containing hydrogen, comprising a polymer-electrolyte membrane-(PEM)-cell including a proton-conducting polymer membrane, an anode on one side and a cathode on the other side of the membrane, the anode being in the form of a bilayer anode which comprises a CO-oxidation-selective catalyst layer on the side facing away from the membrane and an electrochemically active layer for oxidizing the hydrogen to protons on the side facing the membrane, and further including a planar, porous support layer which is provided at the anode side and adjoins a current collector, so that the PEM cell is able to withstand differential pressures of at least about 10 bar.

The invention further relates to a process for the combined purification and compression of CO-containing hydrogen by means of an apparatus according to the invention, wherein the CO in the CO-containing hydrogen is oxidized selectively to $CO_2$ in the first PEM cell, by means of the hydrogen being admixed with an amount of oxygen corresponding to the CO content, said oxygen catalytically oxidizing the CO on the CO-oxidation-selective catalyst layer of the bilayer anode to give $CO_2$, and wherein the now largely CO-free hydrogen is compressed electrochemically by the PEM cell to differential pressures of at least about 10 bar, by virtue of the electrochemically active layer of the bilayer anode oxidizing the hydrogen to protons which, having passed the membrane at the cathode side, are discharged under pressure to give ultrapure hydrogen.

Finally, the invention relates to the use of a hydrogen obtained in accordance with the process according to the invention as a fuel gas in PEM fuel cells, especially for vehicles.

The invention is explained in more detail with reference to the accompanying drawing in which FIG. 1 shows the schematic construction of a bilayer anode used according to the invention in a composite arrangement with a polymer membrane and a cathode.

According to the invention it was found that the purification of CO-containing hydrogen gas can be achieved in a simple manner by the electrochemical hydrogen compression making use of a PEM cell which includes an electrode in the form of a bilayer anode, one layer of the bilayer anode acting catalytically to oxidize CO present in the hydrogen gas selectively to $CO_2$ by means of admixed oxygen. Depending on the CO fraction, the hydrogen gas may, for example, be admixed with up to 1000 ppm of oxygen. This purification effect reduces the CO content of the hydrogen to such an extent that the second layer of the bilayer anode, i.e. the electrode layer exhibiting electrochemical action, is not poisoned by CO. The second electrode layer is therefore able to act as a conventional PEM anode and to oxidize the now largely CO-free hydrogen to protons which, having passed the polymer membrane, are discharged at the cathode under pressure to give ultrapure hydrogen. Thus the PEM cell acts as a continuous CO getter.

By means of the apparatus according to the invention it is possible to compress the pure hydrogen gas to at least about 10 bar. The cracking, to which the electrode mountings in conventional PEM cells are subject above a differential pressure of about 5 bar, is prevented according to the invention by appropriate reinforcements on the anode side of the PEM cell. This is achieved by the electrode-membrane-electrode unit being supported on the anode side (low-pressure side or hydrogen gas supply side), by means of a planar, low-roughness gas distribution layer, in such a way that no unevennesses caused by cavities, such as gas distribution ducts, are produced which might cause rupturing of the membrane at high differential pressures. This gas distribution layer adjoins a planar or smooth current collector plate.

According to one embodiment, the current collector plate has no gas distribution ducts and is provided with the gas distribution layer which has a resistance to pressure of at least the sum of the application pressure and the particular final hydrogen pressure and has a smooth or planar surface. According to another embodiment, the current collector plate has gas distribution ducts on the surface side and is provided with the gas distribution layer which has a resistance to pressure of at least the sum of the application pressure and the particular final hydrogen pressure and has an adequate flexural strength so that the application pressure of the membrane is evenly distributed, notwithstanding the gas ducts present, over the entire area. The gas distribution layer can be formed, for example, from metal fibre plates or metal felt plates.

The CO-oxidation-selective catalyst layer of the bilayer anode suitably comprises an electrically conducting matrix and an oxidic support material, which is coated with fine, metallic, CO-oxidation-selective catalyst particles. Examples of suitable materials for the electrically conducting matrix are metal felt or graphite.

The oxidic support material enhances the catalytic action (spillover effect) and is formed, for example, from zirconium oxide, titanium dioxide, cobalt oxide, cerium oxide, praseodymium oxide, yttrium oxide, mixtures thereof or mixed oxides thereof. The specific surface area of these oxidic support materials is suitably from 1 to 100 $m^2/g$, preferably more than 10 $m^2/g$.

The CO-oxidation-selective catalyst particles are formed, for example, from gold, ruthenium, rhodium or alloys thereof.

The second electrode layer, exhibiting electrochemical action, of the bilayer anode is formed from such materials as are customarily used for PEM anodes.

The apparatus according to the invention may comprise a single PEM cell. To achieve differential pressures of more than about 15 bar, however, a second PEM cell is preferably connected in series with the first PEM cell. This second and, where present, each further PEM cell comprises a proton-conducting polymer membrane, an anode on one side and a cathode on the other side of the membrane, and a planar, porous gas distribution layer which is provided at the anode side and adjoins a current collector plate, so that the said cell is able to withstand a differential pressure of more than about 15 bar.

The proton-conducting polymer membrane employed in the apparatus according to the invention is made of materials customarily employed for PEM cells, such as are available, for example, under the trademark Nafion. This polymer membrane is provided on both sides, in a manner known per se, with one electrode each which suitably comprise a catalytically activated support substrate and binders, for example carbon black and polytetrafluoroethylene. Potentially suitable as the catalyst are materials known per se which exhibit sufficiently high activity for hydrogen oxidation or hydrogen reduction, preferably metals and alloys of the platinum group.

Control of the compression efficiency of the PEM cells is suitably achieved by means of a control signal. For this purpose, the voltage source that provides the current required for compression is disconnected periodically for a brief interval and the potential which establishes itself at the end or during the disconnection time is measured. This potential allows a determination of the actual pressure according to the Nernst equation. Via a conventional control device, this potential is compared with the potential that establishes itself at the target pressure, and based on the difference either the cell current or the cell voltage is preset. The control method used is not subject to any particular restriction, but preference is given to an on/off control or a PID control method.

The PID (Proportional-Integral-Differential) method is a known control method and comprises setting of the manipulated variable additively from (i) a signal proportional to the difference between controlled variable and reference variable and (ii) from an integral signal formed from (i) and (iii) from a differential signal formed from (i). Favourable transient response of the control can be achieved by suitably setting the signal components, which result from (i), (ii) and (iii), to the manipulated variable.

The design of a bilayer anode employed according to the invention is shown in FIG. 1 by way of example, 5 indicating the bilayer anode, 1 the CO-oxidation-selective catalyst layer and 2 the electrochemically active layer for the oxidation of the hydrogen to protons. The catalyst layer 1 here consists of an electrically conducting metal felt matrix 6, which holds an oxidic support material 7 which enhances the catalytic effect and has a specific surface area of more than about 10 $m^2/g$. The support material in turn is coated with very finely distributed metallic catalyst particles 8. The electrochemically active layer 2 consists, for example, of a platinum/ruthenium thin-film anode. The bilayer anode 5 is in a composite arrangement with a polymer membrane 3 and a platinum/carbon cathode 4.

What is claimed is:

1. Apparatus for combined purification and compression of CO-containing hydrogen, comprising a polymer electrolyte membrane (PEM) cell including a proton-conducting polymer membrane (3), an anode on one side and a cathode (4) on the other side of the membrane, the anode having a first side facing away from the membrane and a second side facing the membrane, the anode being in the form of a bilayer anode (5) which comprises a CO-oxidation-selective catalyst layer (1) on the side facing away from the membrane and an electrochemically active layer (2) for oxidizing the hydrogen to protons on the side facing the membrane, wherein the CO-oxidation-selective catalyst layer (1) of the bilayer anode (5) comprises an electrically conducting metal felt matrix (6) and an oxidic support material (7) which is coated with metallic CO-oxidation-selective catalyst particles (8) selected from the group consisting of gold, ruthenium, rhodium and alloys thereof, and further including a planar, porous gas distribution layer which is provided at the anode side and adjoins a current collector, so that the PEM cell is able to withstand differential pressures of at least about 10 bar.

2. Apparatus according to claim 1, comprising at least one second PEM cell connected in series with the first PEM cell, the second PEM cell comprising a proton-conducting polymer membrane, an anode on one side and a cathode on the other side of the membrane, and a planar, porous gas distribution layer which is provided at the anode side and adjoins a current collector, so that the second PEM cell is able to withstand a differential pressure of more than about 15 bar.

3. Apparatus according to claim 1, wherein the current collectors on the anode side of the PEM cells have a planar surface without gas distribution ducts and the gas distribution layer has a resistance to pressure of at least the sum of an initial pressure and the final hydrogen pressure.

4. Apparatus according to claim 1, wherein the gas distribution layer is formed from a metal fibre plate.

5. Apparatus according to claim 1, further comprising a means for controlling the hydrogen pressure of the PEM cell by means of a control signal which is generated at regular intervals by disconnection of the voltage source of the cell and determination of the deviations of the cell voltages then measured from the voltage following from the Nernst equation.

6. Apparatus according to claim 5, wherein the control signal is formed by an on/off or a PID method.

7. Apparatus according to claim 2, wherein the current collectors on the anode side of the PEM cells have a planar surface without gas distribution ducts and the gas distribution layer has a resistance to pressure of at least the sum of the CO-containing hydrogen pressure and the purified hydrogen pressure.

8. Process for the combined purification and compression of CO-containing hydrogen by means of the apparatus according to claim 1, wherein the CO in the CO-containing hydrogen is oxidized selectively to $CO_2$ in the PEM cell, by means of the hydrogen being admixed with an amount of oxygen corresponding to the CO content, said oxygen catalytically oxidizing the CO on the CO-oxidation-selective catalyst layer of the bilayer anode to give $CO_2$ and hydrogen, and wherein the hydrogen is compressed electrochemically by the PEM cell to differential pressures of at least about 10 bar, by virtue of the electrochemically active layer of the bilayer anode oxidizing the hydrogen to protons which, having passed the membrane at the cathode side, are discharged under pressure to give purified hydrogen.

9. Process according to claim 8, wherein the CO-containing hydrogen used is a methanol reformer gas.

10. The process according to claim 8, further comprising the step of utilizing the hydrogen obtained in accordance with the process as a fuel gas in PEM fuel cells.

* * * * *